US012628733B2

(12) United States Patent
Dai et al.

(10) Patent No.: US 12,628,733 B2
(45) Date of Patent: May 19, 2026

(54) RIDING MOWING DEVICE

(71) Applicant: Nanjing Chervon Industry Co., Ltd., Nanjing (CN)

(72) Inventors: Cheng Dai, Nanjing (CN); Zhusheng Nie, Nanjing (CN); Toshinari Yamaoka, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 698 days.

(21) Appl. No.: 18/073,745

(22) Filed: Dec. 2, 2022

(65) Prior Publication Data

US 2023/0200294 A1 Jun. 29, 2023

(30) Foreign Application Priority Data

Dec. 23, 2021 (CN) .......................... 202111591504.1

(51) Int. Cl.
*A01D 34/78* (2006.01)
*A01D 34/66* (2006.01)
*A01D 101/00* (2006.01)

(52) U.S. Cl.
CPC ........... *A01D 34/661* (2013.01); *A01D 34/78* (2013.01); *A01D 2101/00* (2013.01)

(58) Field of Classification Search
CPC ... A01D 34/661; A01D 34/78; A01D 2101/00
See application file for complete search history.

(56) References Cited

U.S. PATENT DOCUMENTS 7,430,847 B2 * 10/2008 Hoffman ................ A01D 69/03
                                                        56/10.8
11,040,670 B2 * 6/2021 Carter .................... B60K 35/55
(Continued)

FOREIGN PATENT DOCUMENTS

CN          201867985 U      6/2011
CN          202481128 U      10/2012
(Continued)

OTHER PUBLICATIONS

Cub Cadet Tank Operator Manual found at https://ia804507.us. archive.org/28/items/manualzilla-id-7403856/7403856.pdf (Year: 2009).*

(Continued)

*Primary Examiner* — Joseph M Rocca
*Assistant Examiner* — Douglas J Meislahn
(74) *Attorney, Agent, or Firm* — Greenberg Traurig, LLP

(57) ABSTRACT

A riding mowing device includes a seat, a frame, a cutting assembly, a walking assembly, a power supply assembly, and a steering wheel assembly. The cutting assembly includes a cutting deck and a mowing element. The cutting assembly is mounted to the frame. The walking assembly is used for driving the riding mowing device to walk. The power supply assembly is used for powering at least the cutting assembly and the walking assembly and mounted to the frame. The steering wheel assembly includes a steering wheel for the user to operate and a support rod connecting the steering wheel to the frame. The riding mowing device further includes a mounting assembly including a locked position and an unlocked position, where when the mounting assembly is in the unlocked position, the steering wheel assembly is switchable between at least a first working position and a second working position.

11 Claims, 11 Drawing Sheets

(56) References Cited

U.S. PATENT DOCUMENTS

| | | | | |
|---|---|---|---|---|
| 2004/0016588 | A1* | 1/2004 | Vitale | B60K 35/22 |
| | | | | 180/322 |
| 2017/0158242 | A1* | 6/2017 | Matsumoto | B60L 50/64 |
| 2019/0367072 | A1* | 12/2019 | Hansen | G05D 1/021 |
| 2024/0149150 | A1* | 5/2024 | Ghahramanian | A63F 13/803 |

FOREIGN PATENT DOCUMENTS

| | | |
|---|---|---|
| CN | 211223591 U | 8/2020 |
| CN | 112373554 A | 6/2022 |
| CN | 112996379 A | 9/2023 |

OTHER PUBLICATIONS

Cub Cadet Tank Website https://web.archive.org/web/20200208034740/ http://www.tractordata.com/lawn-tractors/002/1/7/2172-cub-cadet-tank-s7232.html (Year: 2020) Note: Attached as Two Separate Files, p. 1-26 and p. 27-52.*
JCS Hi Torque vs Nut Bolt Clamp (https://www.youtube.com/watch?v=5JSV4v96JBg) (Year: 2019).*
Rockler Cam Clamps (https://www.youtube.com/watch?v=zO-3wChyngA) (Year: 2011).*
Franklin Brass European Bottom Mount Drawer Slides (https://www.youtube.com/watch?v=VI8sif1SUSg) (Year: 2017).*
CN 102448283 A and its translation (Year: 2012).*

* cited by examiner

Rear

Left — Right

Front

96

932L

932R

13

12

11

121

931L

931R

561

5621B

562B

5623B

5622B

71B

712B

711

561

562C

712C

5622C

RIDING MOWING DEVICE

RELATED APPLICATION INFORMATION

This application claims the benefit under 35 U.S.C. § 119(a) of Chinese Patent Application No. CN 202111591504.1, filed on Dec. 23, 2021, which application is incorporated herein by reference in its entirety.

TECHNICAL FIELD

The present application relates to a garden tool, for example, a riding mowing device.

BACKGROUND

As a type of garden tool, mowers are widely used for trimming lawns and vegetation and in other fields. Riding mowers are more labor-saving and have higher mowing efficiency than hand-propelled mowers. When a riding mower is controlled to steer, the riding mower is required to be able to steer at flexible angles so as to meet a mowing requirement. A steering wheel is operated in a manner similar to a manner in which a steering wheel of a car is operated. Therefore, a riding mower whose traveling direction is controlled by using the steering wheel is easy to use and very friendly to a novice user. However, different users have different body types and heights. If the position of the steering wheel is unique and cannot be adjusted, the comfort with which some users operate the riding mower is reduced.

SUMMARY

A riding mowing device includes a seat for a user to sit on, a frame, a cutting assembly, a walking assembly, a power supply assembly, and a steering wheel assembly. The frame is used for supporting the seat. The cutting assembly includes a cutting deck and a mowing element, where the mowing element is at least partially accommodated in the cutting deck. The walking assembly is used for driving the riding mowing device to walk. The power supply assembly is used for powering at least the cutting assembly and the walking assembly, where the power supply assembly is mounted to the frame. The steering wheel assembly includes a steering wheel for the user to operate and a support rod connecting the steering wheel to the frame. The riding mowing device further includes a mounting assembly including a locked position and an unlocked position, where when the mounting assembly is in the unlocked position, the steering wheel assembly is switchable between at least a first working position and a second working position.

In some examples, the frame includes a longitudinal girder extending along a front and rear direction of the riding mowing device, and the support rod is mounted to the longitudinal girder through the mounting assembly.

In some examples, the support rod includes a first end and a second end, where the first end is fixedly connected to the steering wheel, and the second end is connected to the longitudinal girder.

In some examples, the second end is a straight tube, and a length of the straight tube is greater than or equal to 20 cm and less than or equal to 80 cm.

In some examples, when the mounting assembly is in the unlocked position, the second end of the support rod is operated to slide along the front and rear direction such that the steering wheel assembly is switched between the first working position and the second working position.

In some examples, the first working position and the second working position are distributed along the front and rear direction of the riding mowing device.

In some examples, the mounting assembly includes a support assembly and a bushing assembly, where the bushing assembly is sleeved on a periphery of the second end, and the support assembly is fixed on the longitudinal girder and supports the bushing assembly and the support rod.

In some examples, the support assembly includes a baseplate and a support, where the baseplate is fixedly mounted to the longitudinal girder, the baseplate and the support form an open channel along an extension direction of the longitudinal girder, and the second end of the support rod and at least part of the bushing assembly are disposed in the open channel.

In some examples, the mounting assembly further includes a fastening assembly, where the fastening assembly is operated such that the mounting assembly is switched between the locked position and the unlocked position.

In some examples, the mounting assembly further includes a bolt and a nut, where when the nut is screwed, the bushing assembly is tightened and the mounting assembly is in the locked position; and when the nut is unscrewed, the bushing assembly is loosened and the mounting assembly is in the unlocked position.

In some examples, the fastening assembly includes a quick clamping assembly including a rotatable handle, wherein the handle includes a first position and a second position; when the handle is in the first position, the mounting assembly is in the unlocked position; and when the handle is in the second position, the mounting assembly is in the locked position.

In some examples, the quick clamping assembly includes cam assemblies, where when the handle is rotated, the cam assemblies are displaced along a rotation axis of the handle such that the bushing assembly is tightened or loosened.

In some examples, when the mounting assembly is in the unlocked position, the support rod is operated to rotate about an axis substantially parallel to an extension direction of the second end such that the steering wheel assembly is switched between a storage position and the first working position or between the storage position and the second working position.

In some examples, when the steering wheel assembly is operated to the storage position, the steering wheel does not exceed the seat in an up and down direction.

In some examples, the support rod is a hollow tube, and at least part of wires connected to the steering wheel assembly are disposed in the hollow tube.

DETAILED DESCRIPTION

Figure 1:
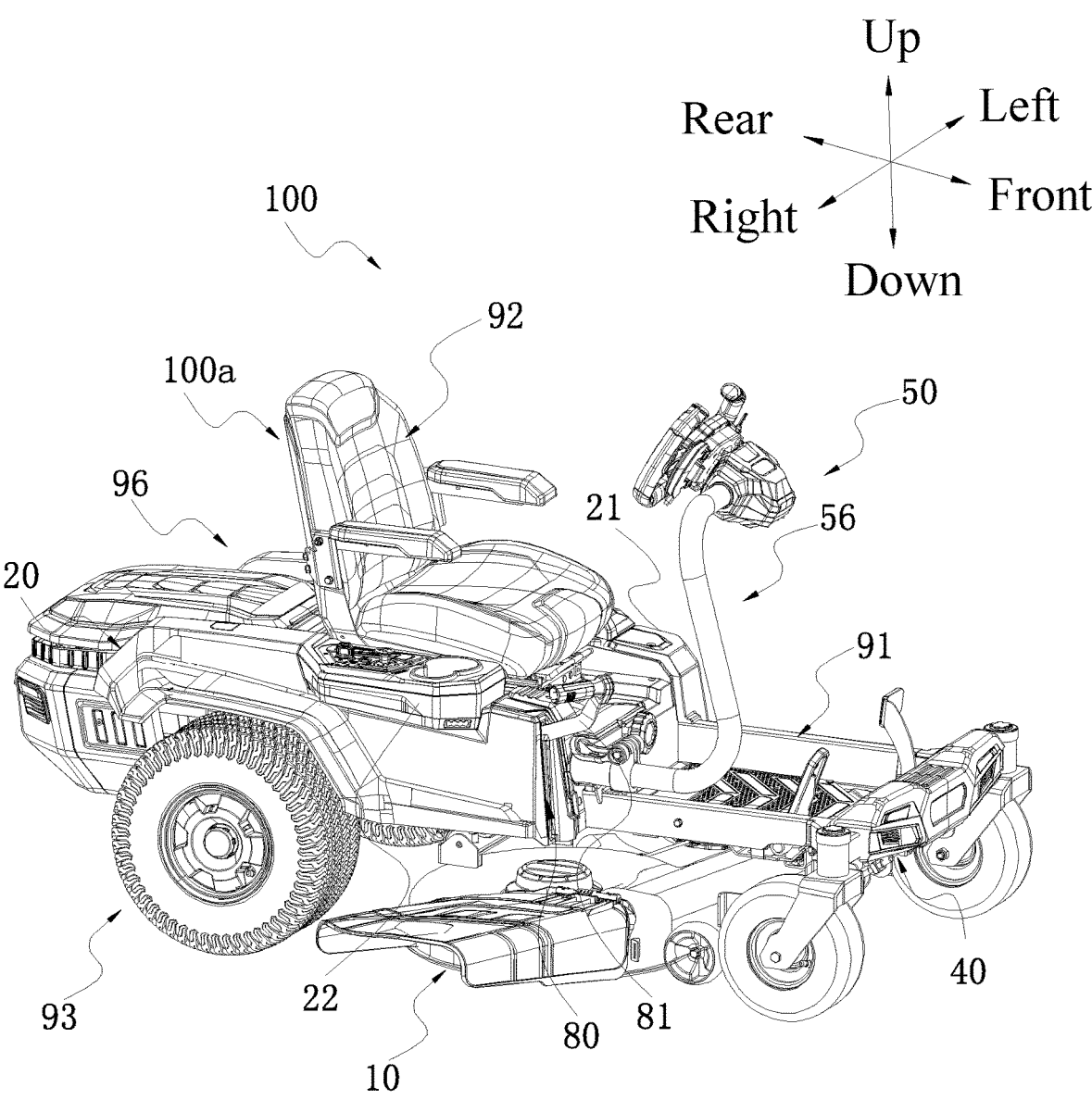
FIG. 1 is a perspective view of a riding mower according to an example of the present application.

As shown in FIG. 1, a riding mowing device of the present application is a riding mower 100. A user may sit on the riding mower 100 to control the riding mower 100 to trim a lawn and other vegetation.

In the specification, front, rear, left, right, up, and down are described as directions shown in FIG. 1. Specifically, when the user sits on the riding mower 100 on the ground, it is defined that a direction which the user faces is front, a direction which the user faces away from is rear, a direction on a left-hand side of the user is left, a direction on a right-hand side of the user is right, a direction towards the ground is down, and a direction away from the ground is up.

As shown in FIGS. 1 to 4, the riding mower 100 includes a cutting assembly 10, a frame 91, a seat 92, a housing system 20, a walking assembly 93, a power supply assembly 96, an illumination system 40, and an operation assembly 50. The frame 91 and the housing system 20 constitute a main body 100a of the riding mower 100, the main body 100a is used for mounting the cutting assembly 10, the seat 92, the power supply assembly 96, and the illumination system 40, and the walking assembly 93 is used for supporting the main body 100a. The riding mower 100 provides energy for the cutting assembly 10, the walking assembly 93, the illumination system 40, and the like through a power assembly. In this example, the power assembly of the riding mower 100 is the power supply assembly 96 which provides electrical energy for each assembly of the riding mower 100 so that the riding mower 100 can be used as a power tool. The electric riding mower 100 is more environmentally friendly and saves more energy than a fuel-based riding mower 100.

Figure 2:
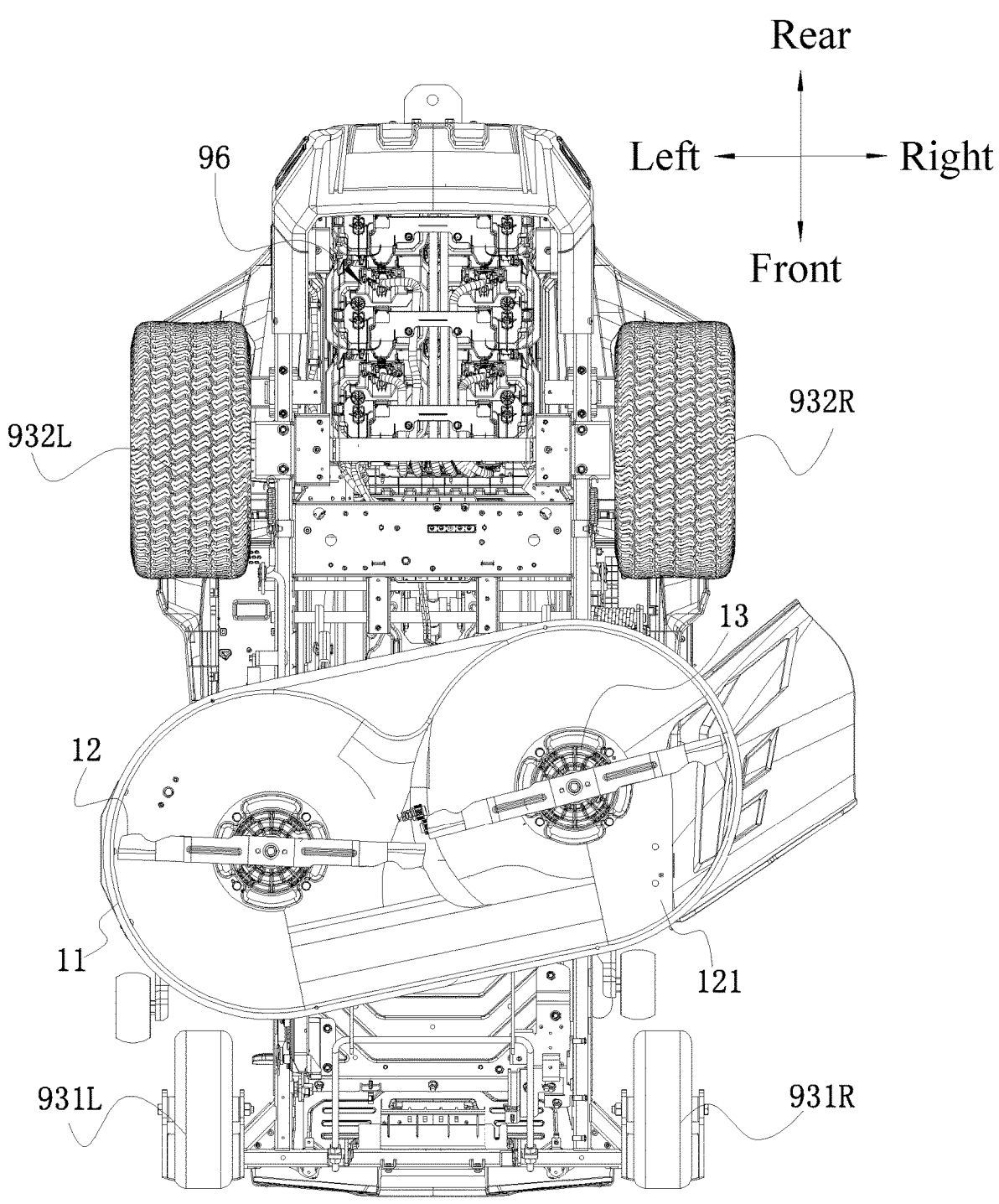
FIG. 2 is a bottom view of the riding mower in FIG. 1.

The cutting assembly 10 is used for outputting power to implement a function of the riding mower 100. The cutting assembly 10 serves as a power output member supported by the main body 100a. Referring to FIG. 2, the cutting assembly 10 includes a cutting deck 11, a mowing element 12, and a first motor 13 for driving the mowing element 12. In some examples, power of the first motor 13 is about 1500 W. In some examples, the power of the first motor 13 is about 3000 W. The mowing element 12 is driven by the first motor 13 to rotate at a high speed to cut vegetation. For example, the mowing element 12 is a blade for cutting grass on a lawn. The cutting deck 11 surrounds a mowing space 121 for accommodating at least part of the mowing element 12, that is, the mowing element 12 is at least partially accommodated in the cutting deck 11. The first motor 13 is used for driving the mowing element 12 to rotate. The cutting assembly 10 is disposed below the frame 91. In some examples, two mowing elements 12 may be provided, two first motors 13 may be provided, and correspondingly, the two first motors 13 drive the two mowing elements 12 separately. In some other examples, three mowing elements 12 may be provided, three first motors 13 may be provided, and correspondingly, the three first motors 13 drive the three mowing elements 12 separately. The mowing element 12 is disposed in the mowing space 121 surrounded by the cutting deck 11. The mowing space 121 is open downward so that the mowing element 12 can perform cutting operations on vegetation below the mowing space 121.

The frame 91 extends substantially along a front and rear direction of the riding mower 100, and the cutting assembly 10, the housing system 20, the seat 92, the walking assembly 93, the power supply assembly 96, and the illumination system 40 are all mounted to the frame 91 for supporting the body of the whole riding mower 100. The walking assembly 93 is used for supporting the frame 91 so that the riding mower 100 can walk on the ground, and the walking assembly 93 includes a first walking assembly 931 and a second walking assembly 932. In this example, the first walking assembly 931 is a front walking assembly including two first walking wheels which are a left first walking wheel 931L and a right first walking wheel 931R; and the second walking assembly 932 is a rear walking assembly including two second walking wheels which are a left second walking wheel 932L and a right second walking wheel 932R. A second walking wheel has a greater radius than a first walking wheel. The left first walking wheel 931L and the right first walking wheel 931R are connected to each other through a front axle 934; and the left second walking wheel 932L and the right second walking wheel 932R are connected to each other through a rear axle. The walking assembly 93 further includes a second motor for driving the second walking assembly 932. In some examples, two second motors are provided, that is to say, the left second walking wheel 932L and the right second walking wheel 932R are driven by their respective second motors. In some examples, power of the second motor is about 1500 W. In some examples, the power of the second motor is about 3000 W.

The frame 91 includes longitudinal girders and beams. In some examples, the frame 91 includes two longitudinal girders which are a first longitudinal girder 911 and a second longitudinal girder 912 separately. The frame 91 further includes two beams which are a first beam 913 and a second beam 914 separately. The first longitudinal girder 911 is disposed on a left side of the seat 92, and the second longitudinal girder 912 is disposed on a right side of the seat 92. The first longitudinal girder 911 extends along a first straight line 1b, and the second longitudinal girder 912 extends along a second straight line 1c, where the first straight line 1b and the second straight line 1c are parallel to each other. In this example, the first longitudinal girder 911 and the second longitudinal girder 912 extend along the front and rear direction of the riding mower 100, and extension directions of the first longitudinal girder 911 and the second longitudinal girder 912 are parallel to each other. The first beam 913 is disposed substantially at a front end of the riding mower 100. Thus, the first beam 913 also serves as a front bumper for protecting the front end of the riding mower 100 from being damaged. The second beam 914 is disposed substantially at a rear end of the riding mower 100. Thus, the second beam 914 also serves as a rear bumper for protecting the rear end of the riding mower 100 from being damaged. The first beam 913 and at least part of the second beam 914 extend along a transverse straight line 1e, where the transverse straight line 1e extends along a left and right direction of the riding mower 100. In this example, extension directions of the first beam 913 and the second beam 914 are parallel to each other, but the transverse straight line 1e is perpendicular to the first straight line 1b and the second straight line 1c. The first longitudinal girder 911, the second longitudinal girder 912, the first beam 913, and the second beam 914 may be fixed together through fasteners such as bolts or may be fixed together through welding.

The housing system 20 includes a left cover 21 and a right cover 22. The left cover 21 is disposed on the left side of the seat 92, and the right cover 22 is disposed on the right side of the seat 92. The left cover 21 at least partially covers the left second walking wheel 932L, and the right cover 22 at least partially covers the right second walking wheel 932R. Specific structures and materials of the left cover 21 and the right cover 22 are not limited in the present application. In this example, the housing system 20 further includes a bottom plate 94 disposed between the first longitudinal girder 911 and the second longitudinal girder 912. When sitting on the riding mower 100, the user may step on the bottom plate 94.

The power supply assembly 96 is used for providing electric power for the cutting assembly 10, the walking assembly 93, the illumination system 40, and the like, where the first motor, the second motor, and the illumination system 40 serve as powered devices included in the riding mower 100, and these powered devices can convert the electrical energy into other forms of energy. The power supply assembly 96 includes at least one battery pack for storing electrical energy. In some examples, a voltage of the battery pack is about 56 V. In some examples, the power supply assembly 96 is disposed in the rear of the riding mower 100, and specifically, the power supply assembly 96 is disposed behind the seat 92. In other examples, the power supply assembly 96 may be disposed in the front of the riding mower 100. In some examples, the power supply assembly 96 includes six battery packs. The six battery packs are arranged in three rows along the front and rear direction, and two battery packs are arranged in each row along the left and right direction. In addition to the inclusion of only the battery packs, the power supply assembly 96 may be configured to be a combination of a built-in cell module and an externally inserted battery pack. The built-in cell module has a lower cost and a more compact structure than the externally inserted detachable battery pack, which saves a space and a cost and provides more adequate power storage for the riding mower 100. In addition, a certain number of externally inserted detachable battery packs are also provided so that the flexibility of the power supply assembly 96 is also considered. For example, the user may take only the battery packs away for charging and does not need to drive the whole riding mower 100 to a charging station. When the user is inconvenient or has no time to charge the built-in cell module of the riding mower 100, the externally inserted battery packs are inserted so that the requirement for mowing for a short time can be satisfied.

The operation assembly 50 includes a steering wheel assembly 56. In an example, the steering wheel assembly 56 includes a steering wheel 561 and a support rod 562, where the steering wheel 561 may be operated by the user to rotate and the support rod 562 is configured to connect the steering wheel 561 to the frame 91. The support rod 562 has a first end 5621 connected to the steering wheel 561 and a second end 5622 connected to the frame 91. The support rod 562 is a hollow tube, which saves the cost and allows wires 564 of the steering wheel assembly 56 to pass through the hollow tube, thereby improving the safety and aesthetics of wiring. The steering wheel assembly 56 is mounted to the frame 91 through a mounting assembly 70 (where the reference numeral is not shown in the figures). Specifically, the support rod 562 is mounted to a longitudinal girder of the frame 91 through the mounting assembly 70. In this example, the support rod 562 is mounted to the second longitudinal girder 912 on the right side of the seat 92 through the mounting assembly 70 so that it is convenient for the user to get on and off from the left side of the riding mower 100. In other examples, the support rod 562 may be mounted to the first longitudinal girder 911 on the left side of the seat 92 through the mounting assembly 70.

Figure 5A:
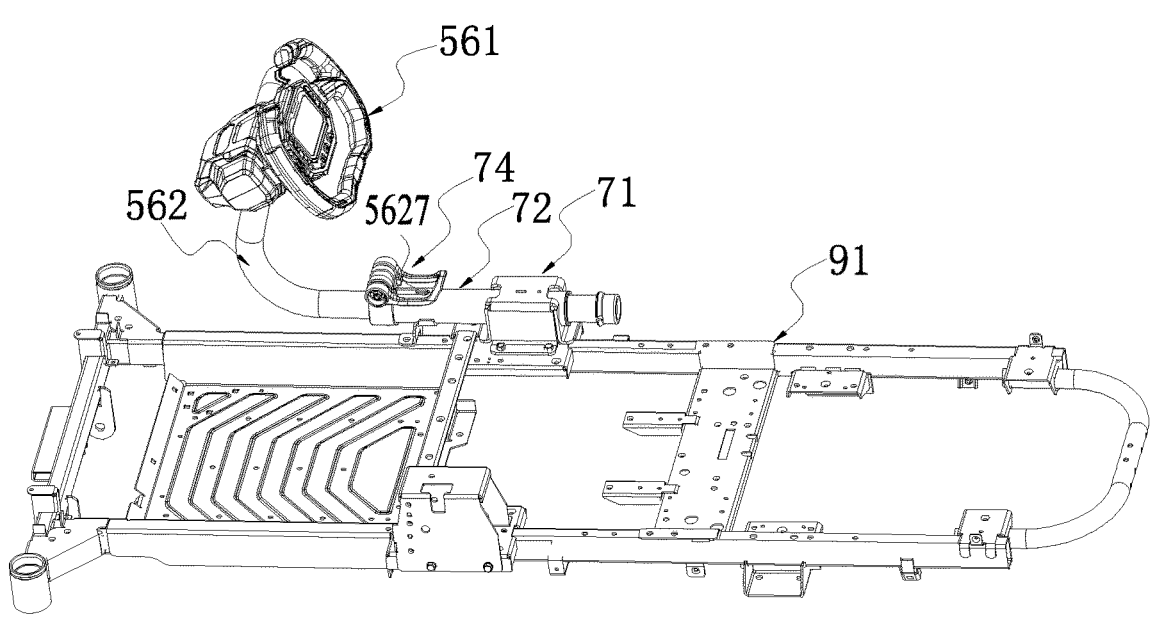
FIG. 5A is a perspective view of the steering wheel assembly in FIG. 3 in a first working position.
Figure 5B:
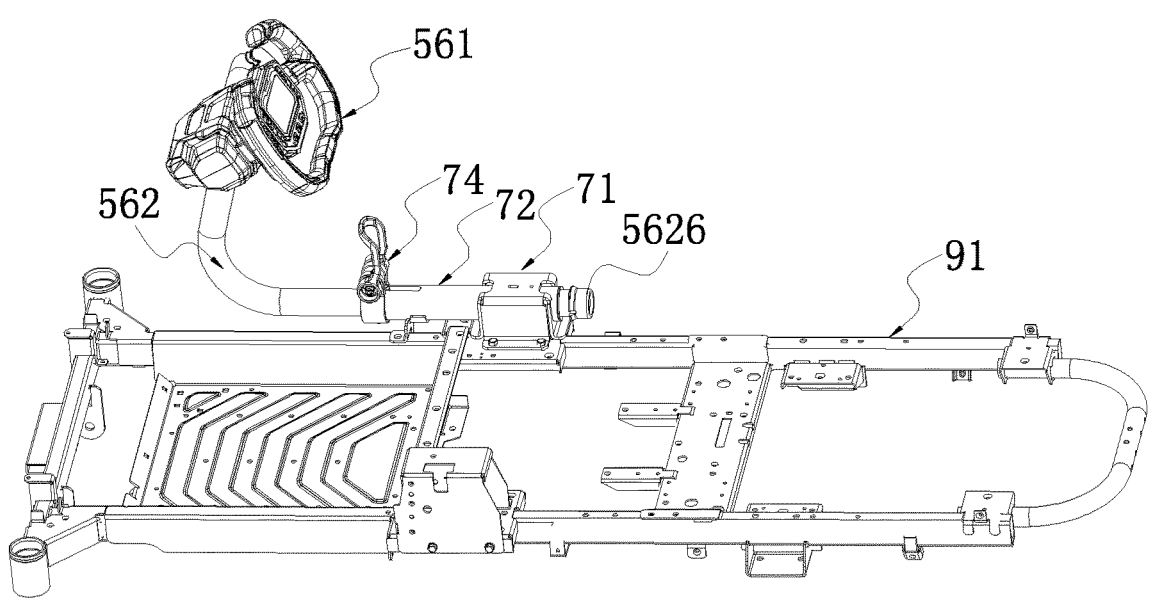
FIG. 5B is a perspective view of the steering wheel assembly in FIG. 3 in a second working position.

The mounting assembly 70 includes a locked position and an unlocked position, where when the mounting assembly 70 is in the unlocked position, the steering wheel 561 and the support rod 562 can slide back and forth relative to the seat 92 such that the steering wheel assembly 56 is switchable between at least a first working position and a second working position. In some examples, the first working position and the second working position are distributed along the front and rear direction of the riding mower 100, where the first working position is shown in FIG. 5A, and the second working position is shown in FIG. 5B. Of course, the steering wheel assembly 56 may have more working positions.

Figure 5C:
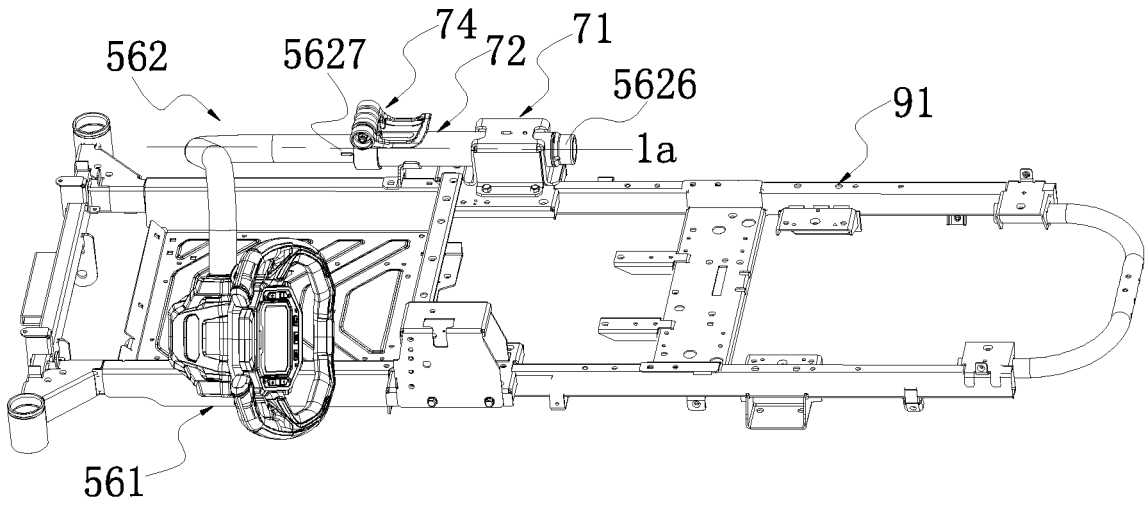
FIG. 5C is a perspective view of the steering wheel assembly in FIG. 3 in a storage position.

In some examples, the steering wheel assembly 56 also has a storage position. When the mounting assembly 70 is in the unlocked position, the support rod 562 is slid forward such that a second limiting member 5627 is located in front of an outer tube 721 and separated from a strip groove 7211 of the outer tube 721. In this case, the second limiting member 5627 no longer limits the rotation of the support rod 562, and the second end 5622 of the support rod 562 is rotatable in the outer tube 721, that is to say, the support rod 562 is rotatable about an axis 1a parallel to the longitudinal girder such that the steering wheel assembly 56 is switched between the storage position and the working position. Referring to FIG. 5C, when the support rod 562 is rotated until the steering wheel 561 is placed on the frame 91 or supported by the frame 91, the steering wheel assembly 56 is in the storage position. In this case, the steering wheel 561 is not higher than the seat 92. Therefore, the space can be saved and the steering wheel 561 is not easily damaged during transportation. With the mounting assembly 70 of the present application, the support rod 562 slides back and forth along the extension direction of the longitudinal girder and is also rotatable about the axis parallel to the longitudinal girder. Thus, the working position of the steering wheel assembly 56 is adjustable and the steering wheel assembly 56 can be stored so that it is more convenient to use the riding mower 100.

Figure 4:
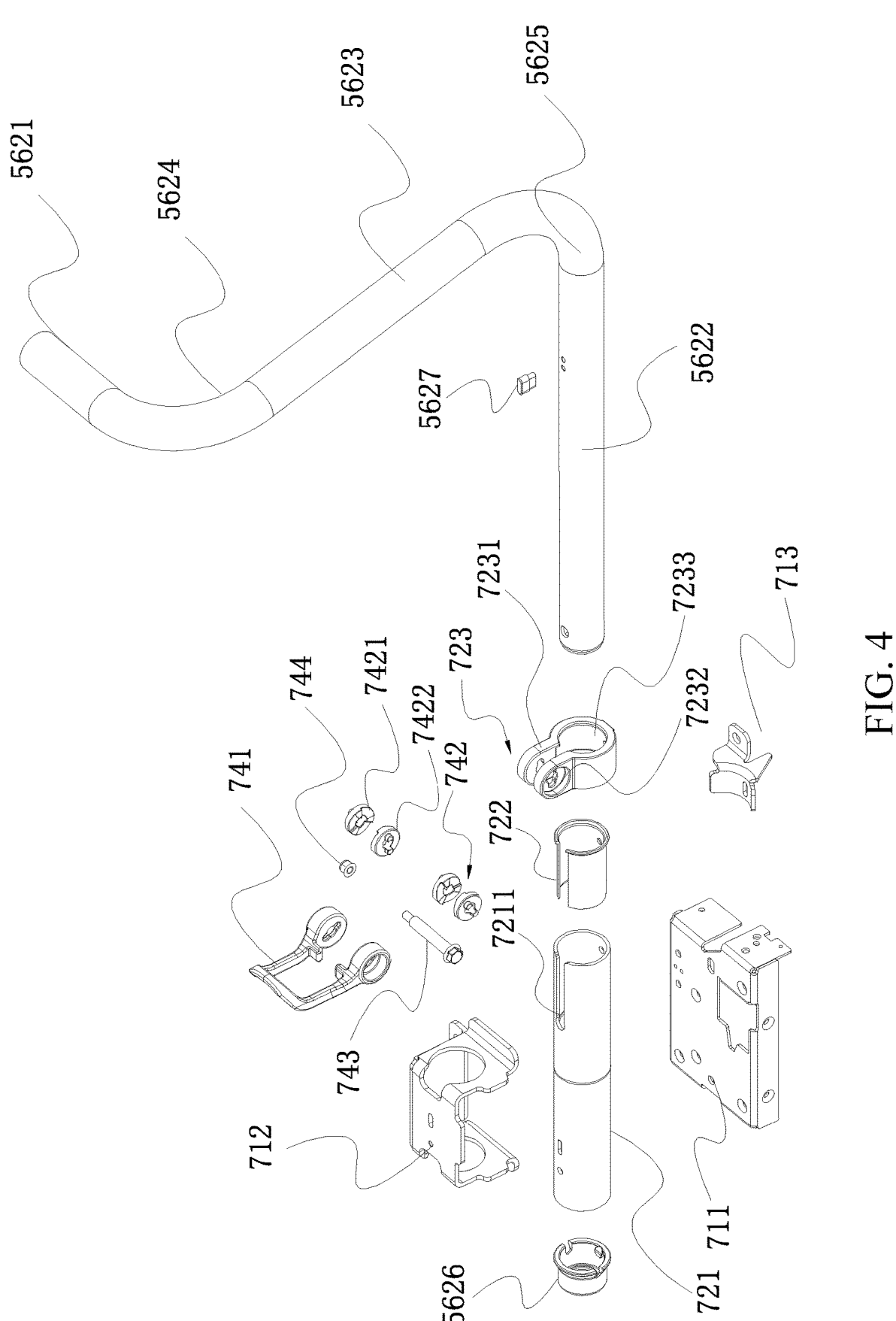
FIG. 4 is an exploded view of the mounting assembly and a support rod in FIG. 3.

As shown in FIG. 4, the support rod 562 includes the first end 5621 and the second end 5622. The first end 5621 is fixedly connected to the steering wheel 561, and the second end 5622 is connected to the mounting assembly 70 so as to be mounted to the second longitudinal girder. When the mounting assembly 70 is in the unlocked position, the second end 5622 is slidable along the extension direction of the longitudinal girder. The first end 5621 is a straight tube, the second end 5622 is also a straight tube, and the first end 5621 and the second end 5622 are connected to each other through an intermediate portion 5623. In some examples, the intermediate portion 5623 is also a straight tube, the first end 5621 and the intermediate portion 5623 are connected to each other through a first bent portion 5624, and the second end 5622 and the intermediate portion 5623 are connected to each other through a second bent portion 5625. The first end 5621, the first bent portion 5624, the intermediate portion 5623, the second bent portion 5625, and the second end 5622 described above are used only for identifying different portions of the support rod 562 and do not indicate that these portions consist of separate or differentiated components. In fact, the first end 5621, the first bent portion 5624, the intermediate portion 5623, the second bent portion 5625, and the second end 5622 may be either a whole which is integrally formed or multiple different components which are fixed together through the welding, threaded connections, fastener connections, or the like.

The mounting assembly 70 includes a support assembly 71 and a bushing assembly 72, where the bushing assembly 72 is sleeved on a periphery of the second end 5622, and the support assembly 71 is fixed on the longitudinal girder and supports the bushing assembly 72 and the support rod 562. The support assembly 71 is covered by the right cover 22. As shown in FIG. 4, the support assembly 71 includes a baseplate 711 and a support 712, where the baseplate 711 is fixedly mounted to the second longitudinal girder 912, the support 712 is fixed above the baseplate 711, an open channel is formed in the extension direction of the second longitudinal girder, and the second end 5622 of the support rod 562 and the bushing assembly 72 pass through the channel and are erected on the support 712. In an example, the baseplate 711 is fixed to the second longitudinal girder 912 through the fasteners such as screws or the bolts. A width of the baseplate 711 is greater than a width of the second longitudinal girder 912. To make the baseplate 711 firmer, edges protruding downward are formed around the baseplate 711, and the edges are formed with open slots each of which has a width substantially the same as the width of the second longitudinal girder 912. Thus, the edges of the baseplate 711 are clamped on the second longitudinal girder 912, thereby preventing the baseplate 711 from shaking or turning sideways. The support 712 is fixed to the baseplate 711 through the fasteners such as the bolts and nuts, and the second end 5622 of the support rod 562 and the bushing assembly 72 pass through the support 712. In some examples, the bushing assembly 72 is fixed to the support 712. In some examples, the second end 5622 of the support rod 562 and the bushing assembly 72 are erected slightly above the second longitudinal girder 912 or suspended from the second longitudinal girder 912 by the support 712.

The bushing assembly 72 includes the outer tube 721, a bushing 722, and a clamp 723. The outer tube 721 is a hollow tube and extends along the extension direction of the second longitudinal girder. For ease of description, an end of the outer tube 721 facing the front of the riding mower 100 is defined as a front end, and an end of the outer tube 721 facing the rear of the riding mower 100 is defined as a rear end. The outer tube 721 is sleeved on the periphery of the second end 5622 of the support rod 562, that is to say, the support rod 562 extends out from two ends of the outer tube 721. More specifically, an end of the support rod 562 extends out from the rear end of the outer tube 721, and part of the second end 5622 of the support rod 562 and the second bent portion 5625 extend out from the front end of the outer tube 721. The bushing 722 is sandwiched between the outer tube 721 and the second end 5622 of the support rod 562 for the purpose of smooth slides and buffering. The bushing 722 may cover an inner wall of the outer tube 721 or may be distributed at the two ends of the outer tube 721. In some examples, the bushing 722 is made of a rubber material.

At least one end of the outer tube 721 has a variable diameter. The diameter of the outer tube 721 is reduced and increased such that the mounting assembly 70 is switched between the locked position and the unlocked position. In some examples, a front portion of the outer tube 721 is formed with the strip groove 7211 extending along the extension direction of the second longitudinal girder, and the front end of the outer tube 721 is sleeved in the clamp 723. The clamp 723 includes an annular portion 7233 sleeved on the outer tube 721 and two extension arms. An opening deformation region is formed between the two extension arms. When a distance between a first extension arm 7231 and a second extension arm 7232 is reduced, an opening of the clamp 723 is tightened, the diameter of the outer tube 721 is reduced, and at this time, the mounting assembly 70 is in the locked position. When the distance between the first extension arm 7231 and the second extension arm 7232 is increased, the opening of the clamp 723 is loosened, the diameter of the outer tube 721 is increased, and at this time, the mounting assembly 70 is in the unlocked position. In an example, the bushing 722 is disposed at the front end of the outer tube 721. Thus, when the opening of the clamp 723 is tightened, a friction force between the outer tube 721 and the second end 5622 of the support rod 562 is increased, thereby making the position of the support rod 562 firm. In some examples, the support assembly 71 further includes a holder 713 disposed between the second longitudinal girder 912 and the outer tube 721 of the bushing assembly 72, where one end of the holder 713 is fixed to the second longitudinal girder 912 and the other end of the holder 713 supports the outer tube 721 so that the support assembly 71 has a greater load-bearing capacity and the steering wheel assembly is firmer after being mounted.

In some examples, when the mounting assembly 70 is in the unlocked position, the position of the outer tube 721 is unchanged, and the second end 5622 of the support rod 562 is slidable relative to the outer tube 721 along the front and rear direction of the riding mower 100 when adjusted by the user. In this manner, when users having different heights and body types sit on the riding mower 100, the position of the steering wheel assembly 56 can be adjusted according to their own needs, thereby improving comfort and ergonomic experience. In order that the second end 5622 of the support rod 562 can have a sufficient adjustment space, for example, a slide stroke greater than or equal to 10 cm, a length of the outer tube 721 is less than a length of the straight tube of the second end 5622, and the straight tube of the second end 5622 cannot be too short. In some examples, the length of the straight tube of the second end 5622 is greater than or equal to 20 cm and less than or equal to 80 cm. In some examples, the length of the straight tube of the second end 5622 is greater than or equal to 40 cm and less than or equal to 60 cm.

Figure 8:
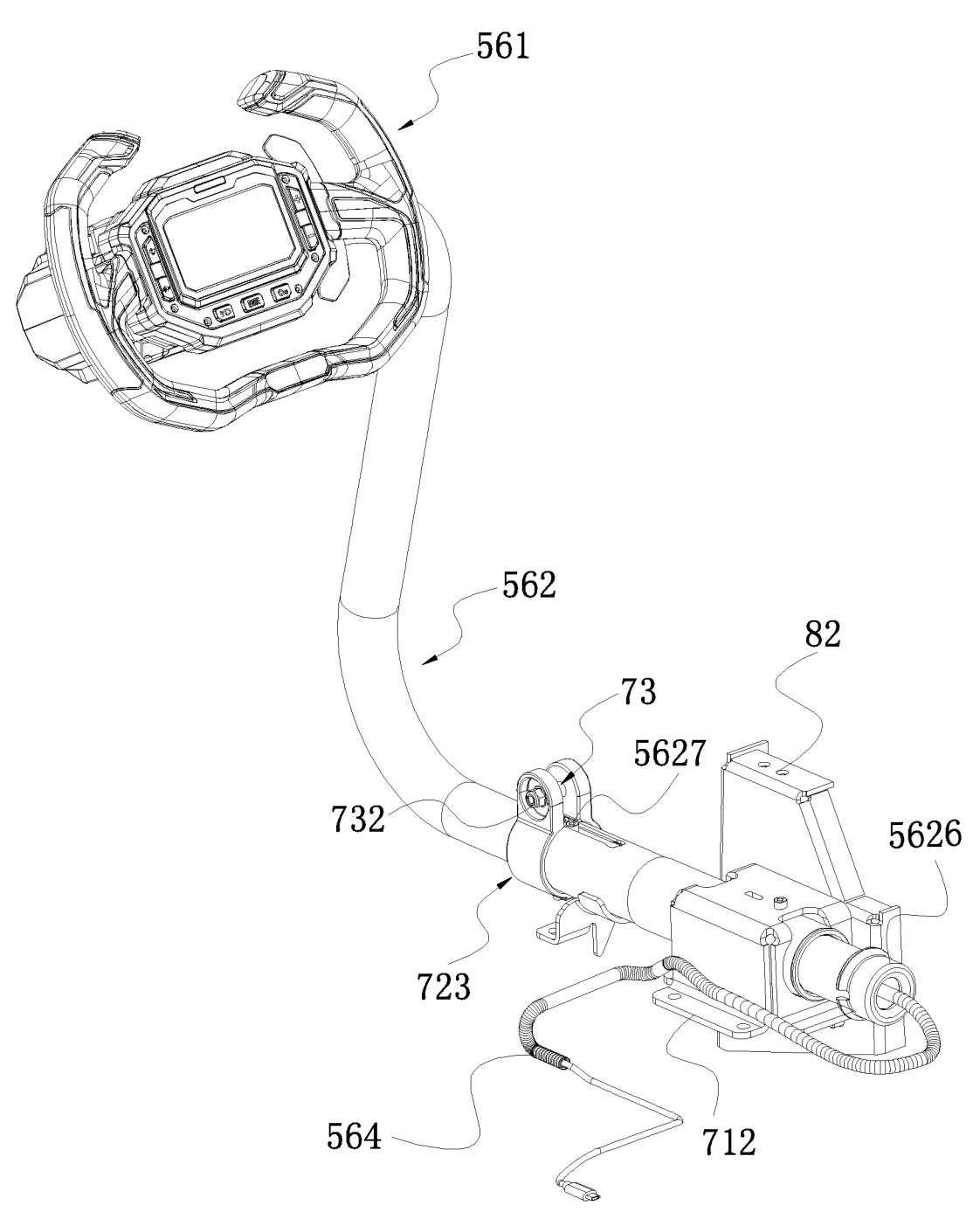
FIG. 8 is a perspective view of a steering wheel assembly and a mounting assembly according to another example of the present application.

Limiting members are further formed or mounted on the support rod 562. A first limiting member 5626 is disposed at the end of the support rod 562, that is, an end of the second end 5622 of the support rod 562. Thus, when the support rod 562 slides forward, the first limiting member 5626 and the rear end of the outer tube 721 form end-surface limitation so that the end of the support rod 562 is prevented from sliding into the outer tube 721, the support rod 562 is prevented from sliding out inadvertently, and positions of the support rod 562 and the steering wheel 561 are also prevented from being too forward. Specifically, the first limiting member 5626 may be a ferrule sleeved on the end of the support rod 562. The ferrule has a maximum diameter greater than a diameter of the support rod 562. In some examples, the ferrule has a maximum diameter approximately equal to a diameter of the rear end of the outer tube 721. In some examples, the bushing 722 extends out to enclose the rear end of the outer tube 721, thereby dampening the impact between the rear end of the outer tube and the ferrule. In some examples, the second limiting member 5627 is further provided. Specifically, as shown in FIG. 5A, the second limiting member 5627 may be a stop block protruding from a surface of the support rod 562, and the stop block may be a waist-shaped block. A width of the stop block is slightly less than a width of the strip groove 7211 of the outer tube 721. Thus, when the support rod 562 slides back and forth, the stop block is clamped in the strip groove 7211 to move back and forth. On the one hand, the circumferential displacement of the support rod 562 can be prevented, that is, the second end 5622 is prevented from rotating in the outer tube 721, thereby preventing the steering wheel assembly from falling down when the bushing assembly 72 is loosened. On the other hand, the support rod 562 is also prevented from sliding too rearward, thereby preventing the positions of the support rod 562 and the steering wheel 561 from being too rearward. When the support rod 562 slides rearward to a certain extent, the stop block is clamped at an end portion of the strip groove 7211 of the outer tube 721 so that the support rod 562 cannot continue to slide rearward. In another example, as shown in FIG. 8, the second limiting member 5627 may be a bolt cap of at least one bolt mounted on the support rod 562.

Figure 6:
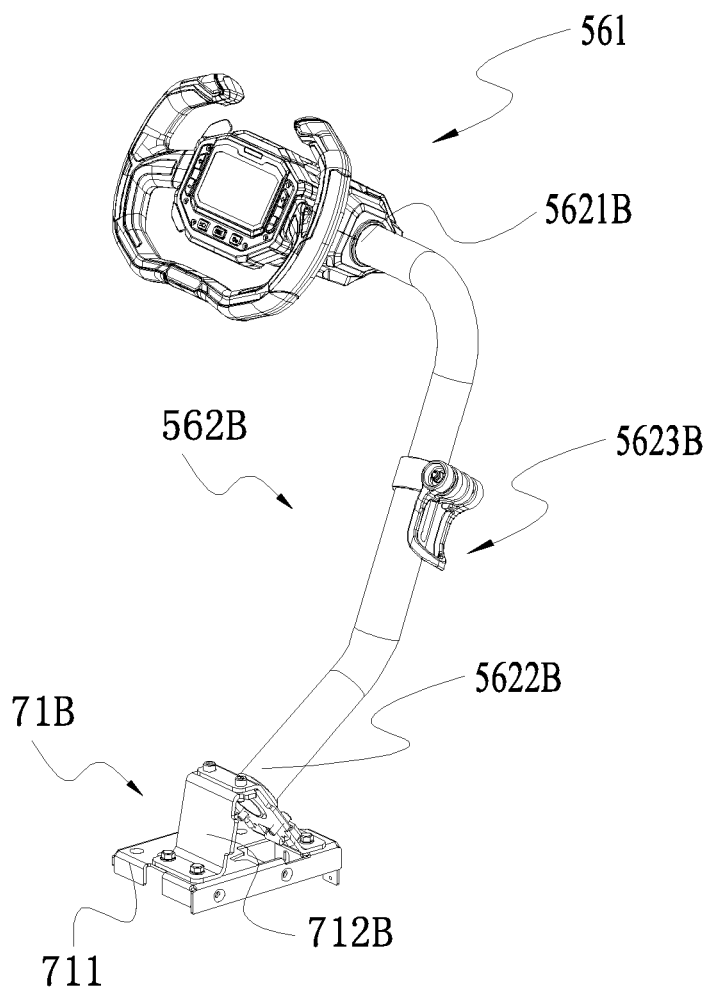
FIG. 6 is a perspective view of a steering wheel assembly and a mounting assembly according to another example of the present application.

In some other examples, as shown in FIG. 6, likewise, a support rod 562B includes a first end 5621B connected to the steering wheel 561, a second end 5622B connected to the mounting assembly, and an intermediate portion 5623B. The intermediate portion 5623B of the support rod 562B may adopt a structure in which an inner tube and an outer tube are nested with each other, so as to facilitate the adjustment of the working position of the steering wheel assembly 56. A support assembly 71B in this example can also use the baseplate 711 in the preceding example. The second end 5622B of the support rod 562B is fixed on the support assembly 71B through a support 712B with a different structure, such as a triangular structure, and the baseplate 711 is further fixed to the frame 91.

Figure 7:
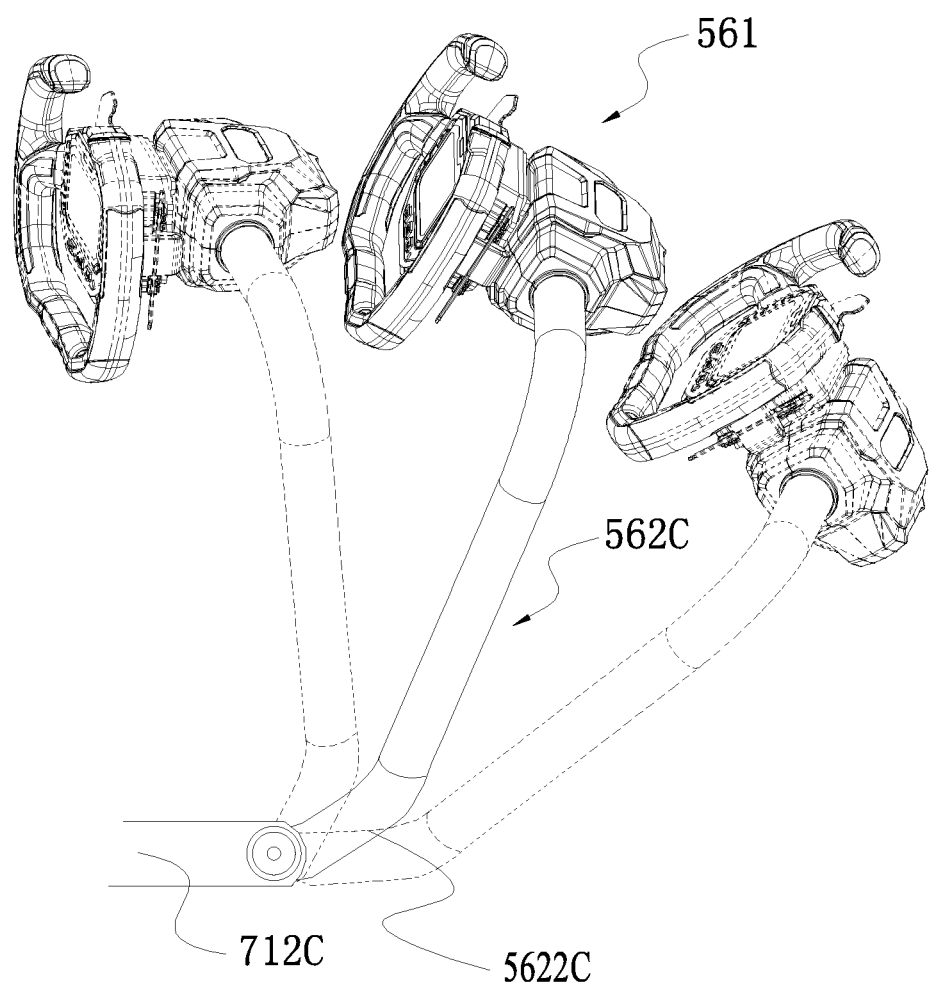
FIG. 7 is a schematic view of a steering wheel assembly and a frame according to another example of the present application.

In some other examples, as shown in FIG. 7, a second end 5622C of a support rod 562C and a support 712C may be connected to each other through a pivot assembly 75 so as to facilitate the adjustment of the position of the steering wheel assembly 56. The support rod 562C is rotatable about an axis of the pivot assembly 75 so that the steering wheel 561 has different working positions and a storage position. The support 712C may be fixed to the baseplate 711, and the baseplate 711 is further fixed to the frame 91.

The riding mower 100 further includes a control module. In some examples, the control module (not shown) is disposed below the seat 92, which can save the space and make the structure of the whole machine more compact. As shown in FIG. 8, the wires 564 of the steering wheel assembly 56 are concentrated into a bundle, pass through the hollow tube of the support rod 562, protrude from the end of the second end 5622 of the support rod 562, and are connected to the control module below the seat 92, which are compact and flexible in structure and do not affect an appearance. In addition, a wiring direction coincides with a sliding direction of the second end 5622, thereby avoiding problems such as the knotting, bending, and abrasion of the wire bundle.

Figure 9:
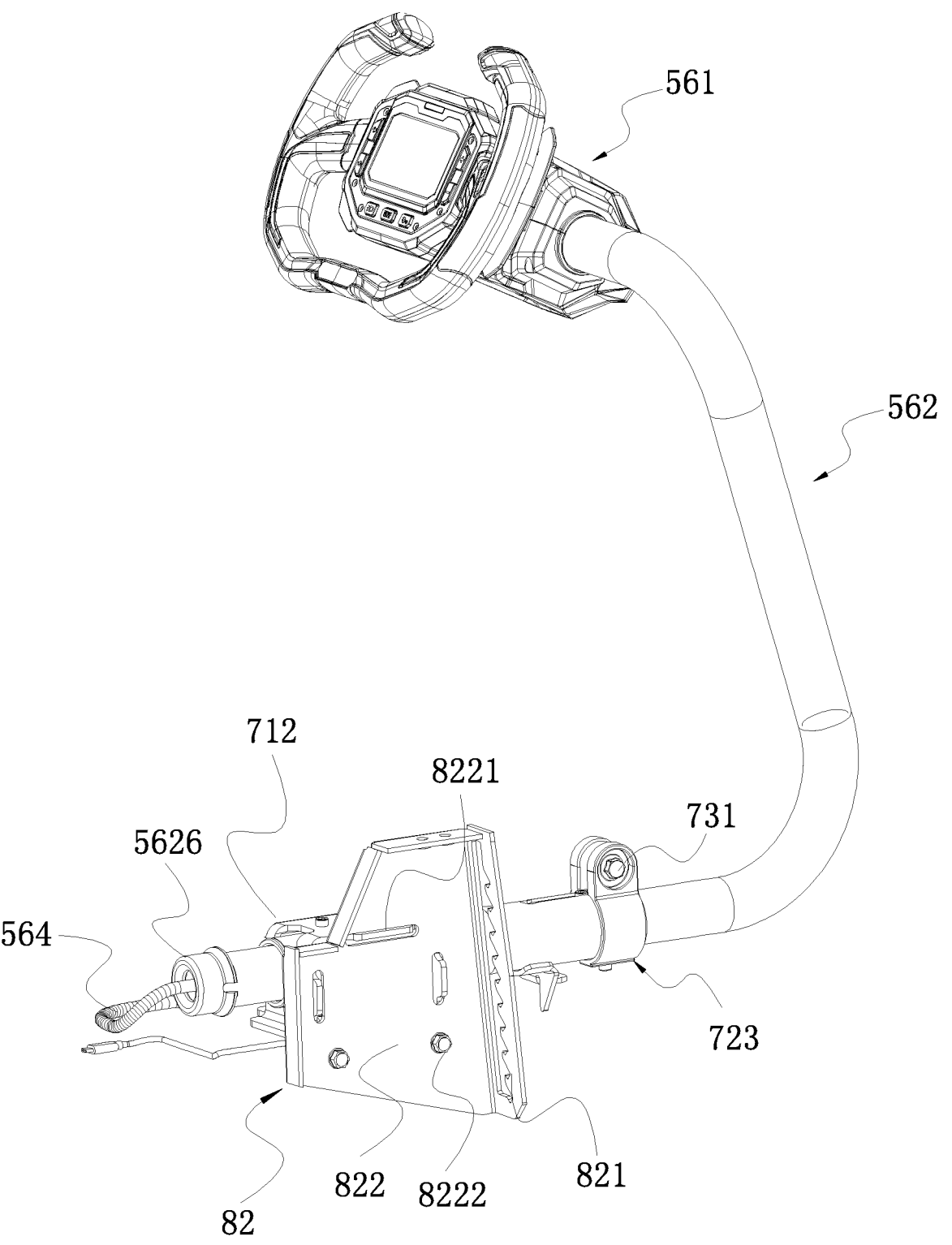
FIG. 9 is a perspective view of the assemblies in FIG. 8 from another angle.

In some examples, as shown in FIGS. 8 and 9, the mounting assembly 70 further includes a fastening assembly 73 for adjusting tightness of the clamp 723. The fastening assembly 73 includes a bolt 731 and a nut 732, where when the nut 732 is screwed, the bushing assembly 72 is tightened, and the mounting assembly 70 is in the locked position; and when the nut 732 is unscrewed, the bushing assembly 72 is loosened, and the mounting assembly 70 is in the unlocked position. Specifically, the first extension arm 7231 of the clamp 723 and the second extension arm 7232 of the clamp 723 are provided with opposite holes, and after the bolt 731 sequentially passes through the two holes, the nut 732 is screwed such that the distance between the first extension arm 7231 and the second extension arm 7232 is reduced and the clamp 723 can be tightened. Thus, the diameter of the outer tube 721 is reduced, and the mounting assembly 70 is locked. When the mounting assembly 70 needs to be unlocked, the nut 732 is unscrewed such that the distance between the first extension arm 7231 and the second extension arm 7232 is increased, the clamp 723 is loosened, and the diameter of the outer tube 721 is increased.

In another example, the mounting assembly 70 further includes a quick clamping assembly 74 including a rotatable handle 741, where the handle 741 includes a first position and a second position; when the handle 741 is in the first position, the mounting assembly 70 is in the unlocked position; and when the handle 741 is in the second position, the mounting assembly 70 is in the locked position. As shown in FIG. 5B, when the handle 741 is in the first position, the handle 741 is open and away from the outer tube 721. As shown in FIG. 5A, when the handle 741 is in the second position, the handle 741 is close to the outer tube 721. With the handle 741, the user can conveniently switch the mounting assembly 70 between the locked position and the unlocked position and can unlock or lock the mounting assembly 70 without an additional tool such as a wrench.

Figure 10:
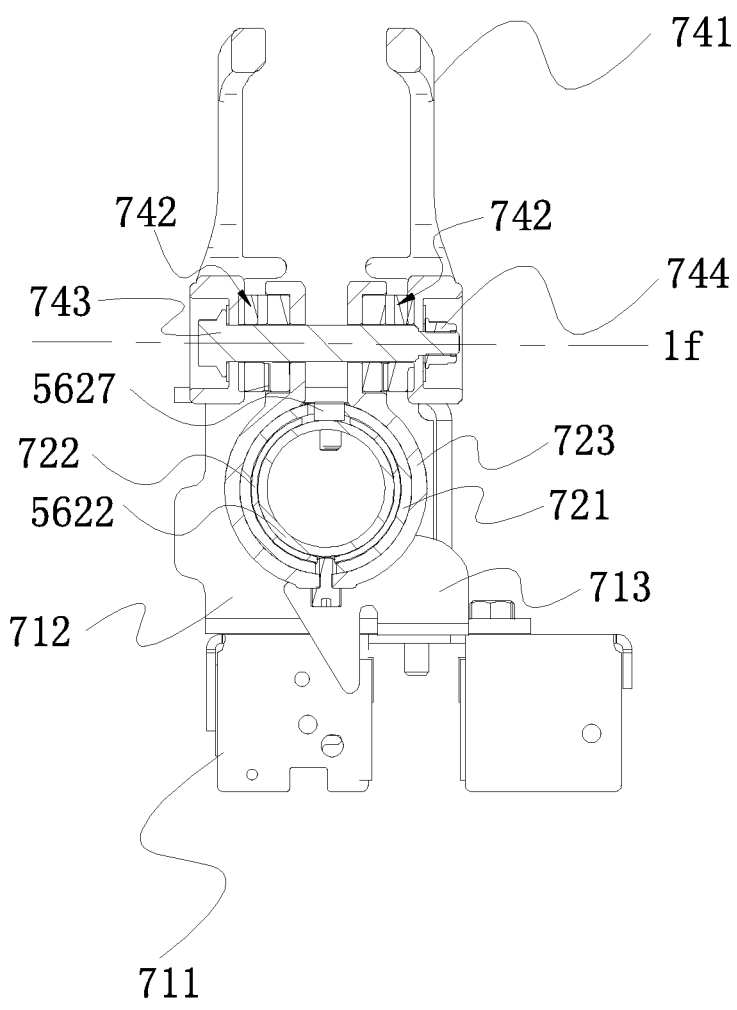
FIG. 10 is a sectional view of the mounting assembly in FIG. 8.

In some examples, referring to FIGS. 4 and 10, the quick clamping assembly 74 includes cam assemblies 742, where when the handle 741 is rotated, the cam assemblies 742 are displaced along a rotation axis if of the handle 741 such that the opening of the clamp 723 is tightened or loosened. The rotation axis if of the handle 741 passes through the first extension arm 7231 and the second extension arm 7232. Each of two cam assemblies 742 is disposed between the opening of the clamp 723 and the handle 741. That is to say, one cam assembly 742 is disposed between the first extension arm 7231 of the clamp 723 and the handle 741 on a left side of the first extension arm 7231, and the other cam assembly 742 is disposed between the second extension arm 7232 of the clamp 723 and the handle 741 on a right side of the second extension arm 7232. A long bolt 743 sequentially passes through the handle 741, the cam assemblies 742, and the clamp 723. The handle 741 and cams rotate about the long bolt, and the other end of the bolt is fixed to a nut 744, which limits axial displacements of the cams to a certain extent. Each cam assembly 742 includes two cams: a first cam 7421 and a second cam 7422. The first cam 7421 and the handle 741 rotate synchronously. Since contact surfaces between the first cam 7421 and the second cam 7422 are stepped slopes, the first cam 7421 rotates to cause the second cam 7422 to be displaced along the rotation axis if of the handle 741, thereby reducing or increasing the distance between the first extension arm 7231 of the clamp 723 and the second extension arm 7232 of the clamp 723.

Figure 3:
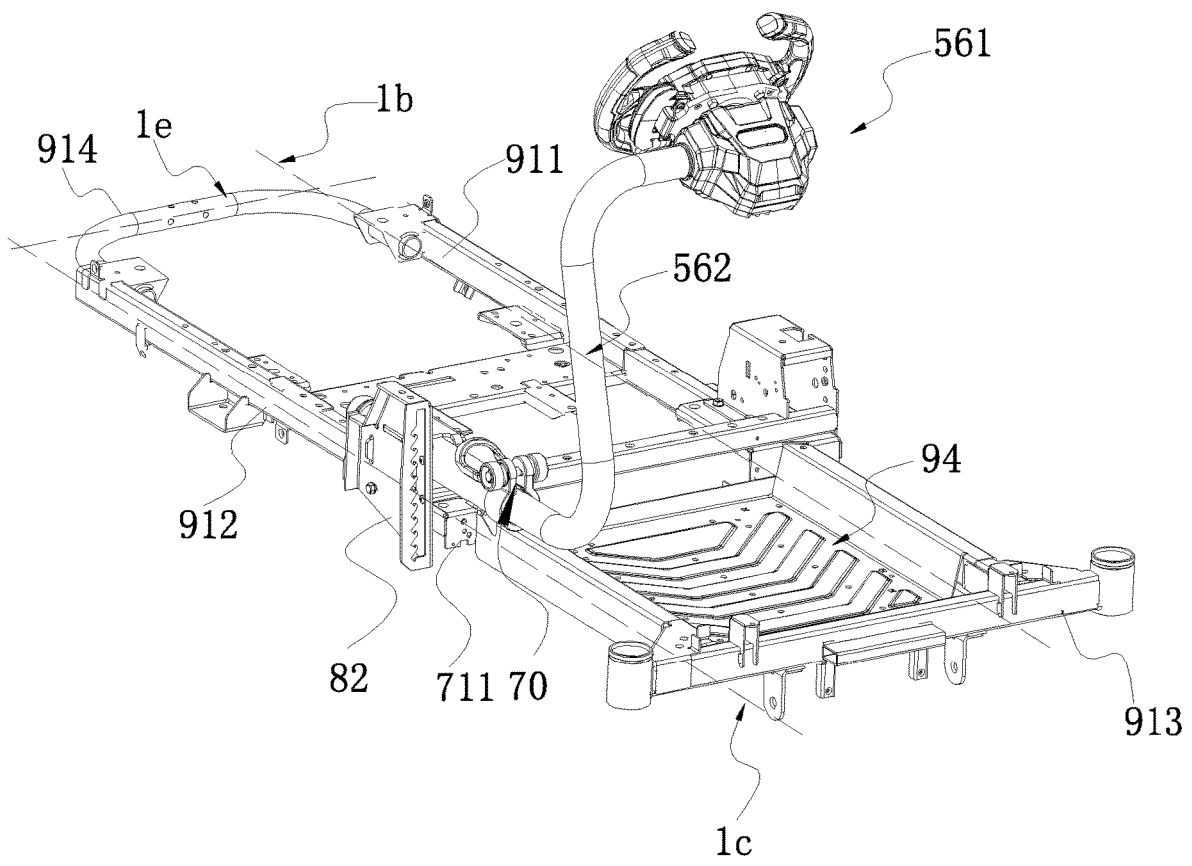
FIG. 3 is a perspective view of a steering wheel assembly, a mounting assembly, and a frame assembly of the riding mower in FIG. 2.

As shown in FIGS. 1 and 3, the riding mower 100 further includes a cutting deck height adjustment assembly 80 for adjusting a height of the cutting deck 11 relative to the frame 91. The cutting deck height adjustment assembly 80 includes a gear assembly and a linkage assembly. The gear assembly includes an adjustment member 81 and a limiting member 82. The adjustment member 81 is operated by the user such that different heights of the cutting deck 11 are set. The limiting member 82 includes multiple gears and is used for limiting the adjustment member 81 to a preset gear. In this example, the limiting member 82 is mounted to the support assembly 71. Referring to FIG. 9, the limiting member 82 includes a limiting portion 821 and a mounting portion 822. The mounting portion 822 is formed with holes 8222, and the fasteners such as the bolts pass through the holes 8222 to fix the limiting member 82 on the baseplate 711. Optionally, the mounting portion 822 is further formed with slots 8221, the support 712 is formed with protruding portion mating with the slots 8221, and the protruding portions extend into the slots 8221, thereby facilitating the positioning and mounting of the limiting member 82.

It is to be noted that the preceding are only preferred examples of the present application and the technical principles used therein. It is to be understood by those skilled in the art that the present application is not limited to the examples described herein. For those skilled in the art, various apparent modifications, adaptations, and substitutions can be made without departing from the scope of the present application. Therefore, while the present application is described in detail in conjunction with the preceding examples, the present application is not limited to the preceding examples and may include equivalent examples without departing from the concept of the present application. The scope of the present application is determined by the scope of the appended claims.

What is claimed is:

1. A riding mowing device, comprising:
a seat for a user to sit on;
a frame for supporting the seat, the frame comprising a longitudinal girder extending along a front and rear direction of the riding mowing device;
a cutting assembly comprising a cutting deck and a mowing element, wherein the mowing element is at least partially accommodated in the cutting deck;
a walking assembly for driving the riding mowing device to walk;
a power supply assembly for powering at least the cutting assembly and the walking assembly, wherein the power supply assembly is mounted to the frame; and
a steering wheel assembly comprising a steering wheel for the user to operate and a support rod that is mounted to the longitudinal girder;
wherein the riding mowing device further comprises a mounting assembly coupled to the longitudinal girder, the mounting assembly having a locked position and an unlocked position, when the mounting assembly is in the unlocked position, the support rod is slidable relative to the longitudinal girder such that the steering wheel is switchable between at least a first working position and a second working position and the support rod is rotatable about an axis substantially parallel to the longitudinal girder such that the steering wheel assembly is switched between a storage position and the first working position or between the storage position and the second working position, and, when the mounting assembly is in the locked position, the support rod is not slidable relative to the longitudinal girder and the support rod is not rotatable about the axis substantially parallel to the longitudinal girder.

2. The riding mowing device according to claim 1, wherein the support rod comprises a first end and a second end, the first end is fixedly connected to the steering wheel, and the second end is connected to the longitudinal girder.

3. The riding mowing device according to claim 2, wherein the second end is a straight tube, and a length of the straight tube is greater than or equal to 20 cm and less than or equal to 80 cm.

4. The riding mowing device according to claim 1, wherein the mounting assembly comprises a support assembly and a bushing assembly, the bushing assembly is sleeved on a periphery of the second end, and the support assembly is fixed on the longitudinal girder and supports the bushing assembly and the support rod.

5. The riding mowing device according to claim 4, wherein the support assembly comprises a baseplate and a support, the baseplate is fixedly mounted to the longitudinal girder, the baseplate and the support form an open channel along an extension direction of the longitudinal girder, and the second end of the support rod and at least part of the bushing assembly are disposed in the open channel.

6. The riding mowing device according to claim 5, wherein the mounting assembly further comprises a fastening assembly and the fastening assembly is operated such that the mounting assembly is switched between the locked position and the unlocked position.

7. The riding mowing device according to claim 6, wherein the mounting assembly further comprises a bolt and a nut, when the nut is screwed, the bushing assembly is tightened and the mounting assembly is in the locked position, and, when the nut is unscrewed, the bushing assembly is loosened and the mounting assembly is in the unlocked position.

8. The riding mowing device according to claim 6, wherein the fastening assembly comprises a quick clamping assembly comprising a rotatable handle, the handle is moveable between a first position and a second position, when the handle is in the first position, the mounting assembly is in the unlocked position, and, when the handle is in the second position, the mounting assembly is in the locked position.

9. The riding mowing device according to claim 8, wherein the quick clamping assembly comprises cam assemblies and, when the handle is rotated, the cam assemblies are displaced along a rotation axis of the handle such that the bushing assembly is tightened or loosened.

10. The riding mowing device according to claim 1, wherein, when the steering wheel assembly is operated to the storage position, the steering wheel does not exceed the seat in an up and down direction.

11. The riding mowing device according to claim 1, wherein the support rod is a hollow tube, and at least part of wires connected to the steering wheel assembly are disposed in the hollow tube.

* * * * *